July 3, 1945. W. O. DAMME ET AL 2,379,848
PRESSURE FILTER
Filed April 8, 1940

INVENTORS
Walter O. Damme
Raymond J. Gabler
BY
ATTORNEY

Patented July 3, 1945

2,379,848

UNITED STATES PATENT OFFICE 2,379,848

PRESSURE FILTER

Walter O. Damme and Raymond J. Gabler, Kansas City, Mo., assignors to Butler Manufacturing Company, Kansas City, Mo., a corporation of Missouri Application April 8, 1940, Serial No. 328,446

3 Claims. (Cl. 210—181)

Our invention relates to pressure filters and more particularly to a pressure filter including in combination a novel means enabling the rapid, expeditious and convenient cleaning of the same.

In pressure filters employed for filtering dry cleaning solvents, a filter aid is employed, adapted to coat the outside of filter screens positioned within a casing. Periodically, it becomes necessary to clean the filter to remove muck, sludge, and contaminated filter cake. Heretofore, it has been the practice to drain the solvent from the filter. Considerable solvent is adsorbed by the muck and used filter cake and, if this is removed before it is substantially dry, a distinct fire hazard is presented. Furthermore, the solvent contained in the sludge represents a loss of solvent. A considerable time period is involved in draining the solvent from the sludge and the cleaning of a filter has heretofore been a time-consuming, risky, and laborious task.

One object of our invention is to provide a novel filter provided with means for rapidly, expeditiously and safely cleaning the same.

Another object of our invention is to provide a pressure filter in which the maximum amount of solvent is recovered from the muck bed before cleaning.

Other and further objects of our invention will appear from the following description.

In the accompanying drawing which forms part of the instant specification and are to be read in conjunction therewith and in which like reference numerals are used to indicate like parts in the various views.

Figures 1, 2, 3:
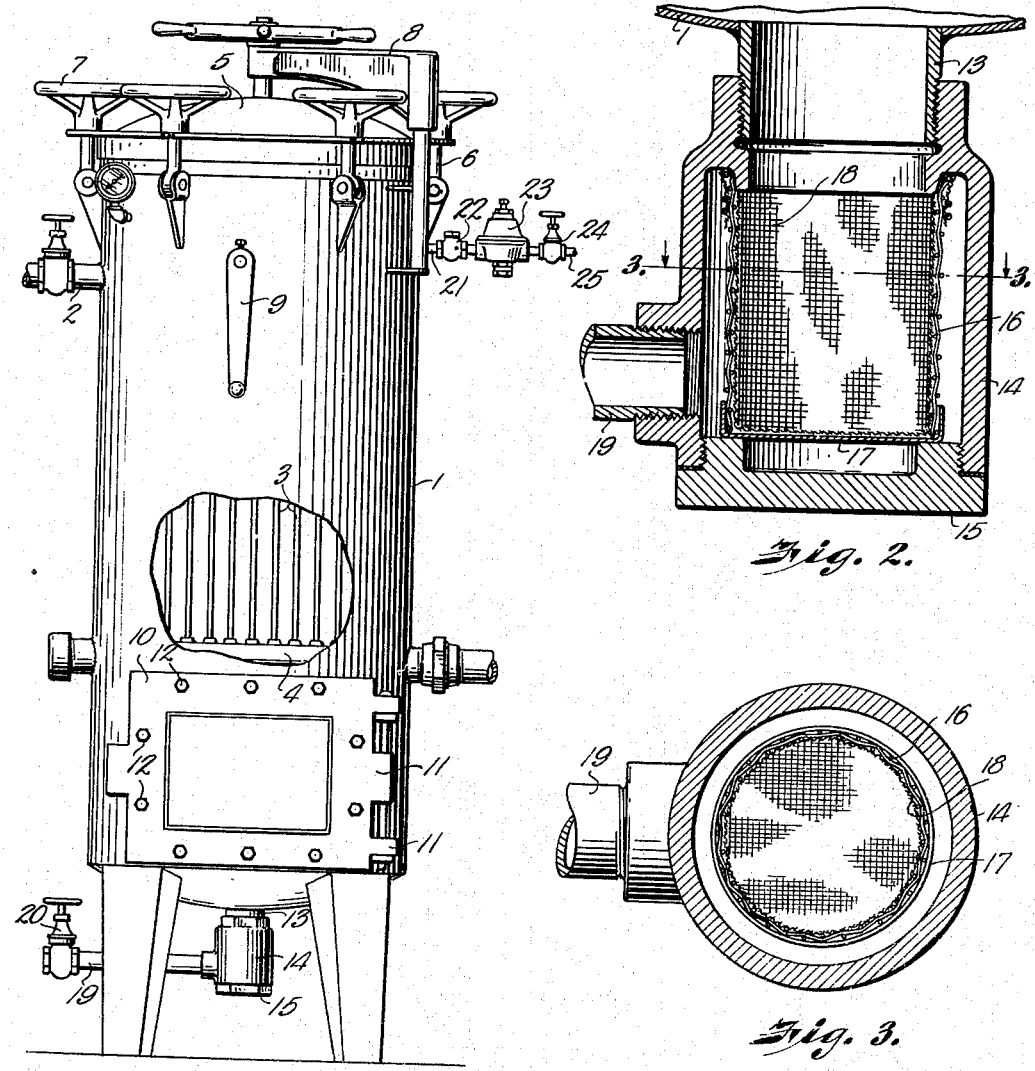
Figure 1 is an elevation of a pressure filter with parts broken away, made in accordance with an embodiment of our invention.
Figure 2 is a fragmentary sectional view of the bottom of our filter.
Figure 3 is a sectional view taken along the line 3—3 of Figure 2.

Referring now to the drawing, the filter comprises a pressure housing 1, into which the liquid to be filtered is introduced through pipe 2 by means of a pump (not shown). A plurality of filter screens 3 are removably seated in a manifold 4, from which the filtered liquid is withdrawn. The top of the housing is closed by a cover 5, held in closed position by means of pivoted dogs 6, provided with pressure nuts 7 adapted to be screwed upon the threaded dogs. The cover is carried by a pivoted arm 8. The filter is provided with filter scraping means known to the art, operated by a handle 9. The lower portion of the filter below the manifold 4 is provided with a door 10, pivoted around hinges 11 and secured in place by stud bolts 12. A drain pipe 13 terminates in a chamber 14. The chamber 14 is provided with a removable bottom 15. A basket 16 of wire mesh is provided with a bottom 17. A filter cloth sack 18 is supported by the wire mesh basket 16, as can readily be seen by reference to Figure 2. The drained liquid is filtered by the filter comprising the wire mesh basket 16 and a filter cloth sack 18, and passes out through drain pipe 19 controlled by valve 20. A pipe 21 communicates with the interior of the pressure filter. A check valve 22 is positioned outboard of the pipe 21. A reducing valve 23 communicates with the check valve 22 and a stop valve 24 controls compressed air from pipe 25.

In operation, when it is desired to clean the filter, the valve 20 is opened, and valve 24 is opened. Compressed air from a suitable source passes through the reducing valve 23 and is reduced to a pressure of about ten pounds per square inch. The superimposed pressure on top of the unfiltered solvent within the housing forces it outwardly through the auxiliary filter in chamber 14 and thence through drain pipe 19. The drained solvent, which in the prior art had to be thrown away since it contained contaminated filter powder and muck in suspension, is thus recovered and may be passed to the body of the dry cleaning solvent. The used filter powder and muck bed will be substantially dry of solvent and can be handled rapidly and expeditiously so that, when the door 10 is opened, it can be removed with shovels and disposed of without inconvenience and without the risk of fire as was heretofore the case. A certain percentage of solvent will be adsorbed by the filter aid and cannot be removed, but the filter powder will be substantially dry to the touch instead of being a sludge or muck as has been the case heretofore.

It will be observed that we employ a controlled air pressure. This is very important and varies with the particular filter aid employed. If the air pressure is too high, channels will be formed in the muck bed and the solvent cannot be removed as the air will blow through the channels thus formed. If the pressure is too low, a longer time will be required to drain the filter. The longer time is not serious but the upper limit of air pressure should be such that no channeling will occur.

It will be seen that we have accomplished the objects of our invention. We have provided a pressure filter which may be readily and expeditiously drained, and the muck bed removed with minimum inconvenience and fire danger, as well as the saving of considerable time. In our method of draining the filter, no loss of solvent present in the operation of draining of the filters of the prior art, is encountered. No danger of clogging the drain pipe with a cake of filter aid or muck is present since the auxiliary filter prevents filter aid and muck from passing into the drain pipe. The basket type auxiliary filter may be quickly removed and cleaned.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, we claim:

1. A pressure filter including in combination a housing means for introducing liquid into said housing, filter leaves within said housing, a manifold for supporting said filter leaves means for withdrawing filtered liquid from said manifold, said housing being formed with an opening below said manifold, a door normally closing said opening, a drain opening formed in said housing adjacent the bottom thereof, a chamber communicating with said opening, an auxiliary filter within said chamber, said auxiliary filter comprising a wire screen basket and a sack of filter cloth supported by said basket, a drain pipe communicating with said chamber for the removal of liquid filtered by said auxiliary filter from said chamber, means for admitting air under pressure into the filter housing above the muck bed deposited therein by the said liquid, and a pressure control means for maintaining the air under sufficient pressure to express liquid adsorbed in the bed without channeling or otherwise agitating the said bed whereby to leave the bed in a substantially dry condition.

2. A pressure filter including in combination a housing means for introducing liquid into said housing, filter leaves within said housing, a manifold for supporting said filter leaves means for withdrawing filtered liquid from said manifold, said housing being formed with an opening below said manifold, a door normally closing said opening, a drain opening formed in said housing adjacent the bottom thereof, a chamber communicating with said opening, said chamber being formed with a separable bottom, means for removably securing said bottom in chamber closing position, an auxiliary filter within said chamber, a drain pipe communicating with said chamber for the removal of liquid filtered by said auxiliary filter from said chamber, and means for compressing the muck bed deposited in the housing by the said liquid without channeling or otherwise agitating the same whereby to express from the said muck bed the liquid adsorbed therein and to leave the bed in a substantially dry condition.

3. A pressure filter including in combination a housing means for introducing liquid into said housing, filter leaves within said housing, a manifold for supporting said filter leaves means for withdrawing filtered liquid from said manifold, said housing being formed with an opening below said manifold, a door normally closing said opening, a drain opening formed in said housing adjacent the bottom thereof, a chamber communicating with said opening, said chamber being formed with a separable bottom, means for removably securing said bottom in chamber closing position, an auxiliary filter within said chamber, said auxiliary filter comprising a wire screen basket and a sack of filter cloth supported by said basket, a drain pipe communicating with said chamber for the removal of liquid filtered by said auxiliary filter from said chamber, means for admitting air under pressure into the filter housing above the muck bed deposited therein by the said liquid, and a pressure control means for maintaining the air under sufficient pressure to express liquid adsorbed in the bed without channeling or otherwise agitating the said bed whereby to leave the bed in a substantially dry condition.

RAYMOND J. GABLER.
WALTER O. DAMME.